(12) United States Patent
Washino et al.

(10) Patent No.: US 10,884,678 B2
(45) Date of Patent: Jan. 5, 2021

(54) INFORMATION PROCESSING APPARATUS, PRINTING SYSTEM, AND NON-TRANSITORY COMPUTER READABLE MEDIUM

(71) Applicant: FUJI XEROX CO.,LTD., Tokyo (JP)

(72) Inventors: Shigeki Washino, Kanagawa (JP); Yoshinori Makishima, Kanagawa (JP)

(73) Assignee: FUJI XEROX CO.,LTD., Tokyo (JP)

( * ) Notice: Subject to any disclaimer, the term of this patent is extended or adjusted under 35 U.S.C. 154(b) by 0 days.

(21) Appl. No.: 16/055,164

(22) Filed: Aug. 6, 2018

(65) Prior Publication Data
US 2019/0294390 A1      Sep. 26, 2019

(30) Foreign Application Priority Data

Mar. 20, 2018   (JP) .................................. 2018-052208

(51) Int. Cl.
*G06F 3/12*          (2006.01)

(52) U.S. Cl.
CPC .......... *G06F 3/1207* (2013.01); *G06F 3/1205* (2013.01); *G06F 3/1259* (2013.01); *G06F 3/1287* (2013.01)

(58) Field of Classification Search
CPC .... G06F 3/1207; G06F 3/1205; G06F 3/1259; G06F 3/1287
See application file for complete search history.

(56) References Cited

U.S. PATENT DOCUMENTS

| 2004/0000246 | A1* | 1/2004 | Keane | G06Q 40/00 101/483 |
| 2009/0128848 | A1* | 5/2009 | Kamisuwa | B41J 11/009 358/1.15 |
| 2013/0144557 | A1* | 6/2013 | Montfort | G06F 11/0733 702/185 |
| 2014/0241583 | A1* | 8/2014 | Connell, II | A47F 9/047 382/103 |
| 2015/0266325 | A1* | 9/2015 | Mizutani | B41J 11/02 347/17 |
| 2016/0267365 | A1* | 9/2016 | Totsuka | H04N 1/52 |

FOREIGN PATENT DOCUMENTS

| JP | 4265180 | 4/2004 |
| JP | 2010134760 | 6/2010 |
| JP | 6017168 | 10/2013 |

* cited by examiner

*Primary Examiner* — Neil R McLean
(74) *Attorney, Agent, or Firm* — JCIPRNET (57) ABSTRACT

An information processing apparatus includes a receiving unit that receives customer information of a customer to whom a product is to be delivered, and image information to be printed on the product, an acquisition unit that acquires a state of a recording medium having an image printed thereon from the image information received by the receiving unit, and an associating unit that associates via a print job the state of the recording medium acquired by the acquisition unit with the customer information received by the receiving unit.

11 Claims, 7 Drawing Sheets

INFORMATION PROCESSING APPARATUS, PRINTING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-052208 filed Mar. 20, 2018.

BACKGROUND

(i) Technical Field

The present invention relates to an information processing apparatus, a printing system, and a non-transitory computer readable medium.

(ii) Related Art

A combination of customer information received from each customer and image information is typically printed on a per customer basis. In such a case, a company that has received the combination of the customer information and the image information may outsource a printing job to an external printing company. A printing request is made to the external printing company in a manner such that the customer information is not leaked to the external printing company. To this end, information identifying each customer is assigned to the customer information such that the customer information is associated with the image information in the correct combination. The printing company delivers printed matter with the combination maintained. The printing company is responsible to deliver printed matter to the print requesting company in a manner such that the printed matter is exactly associated with the identification information of the customer. This involves substantial costs and time.

SUMMARY

According to an aspect of the invention, there is provided an information processing apparatus. The information processing apparatus includes a receiving unit that receives customer information of a customer to whom a product is to be delivered, and image information to be printed on the product, an acquisition unit that acquires a state of a recording medium having an image printed thereon from the image information received by the receiving unit, and an associating unit that associates via a print job the state of the recording medium acquired by the acquisition unit with the customer information received by the receiving unit.

BRIEF DESCRIPTION OF THE DRAWINGS

Exemplary embodiment of the present invention will be described in detail based on the following figures, wherein.

DETAILED DESCRIPTION

Figure 1:
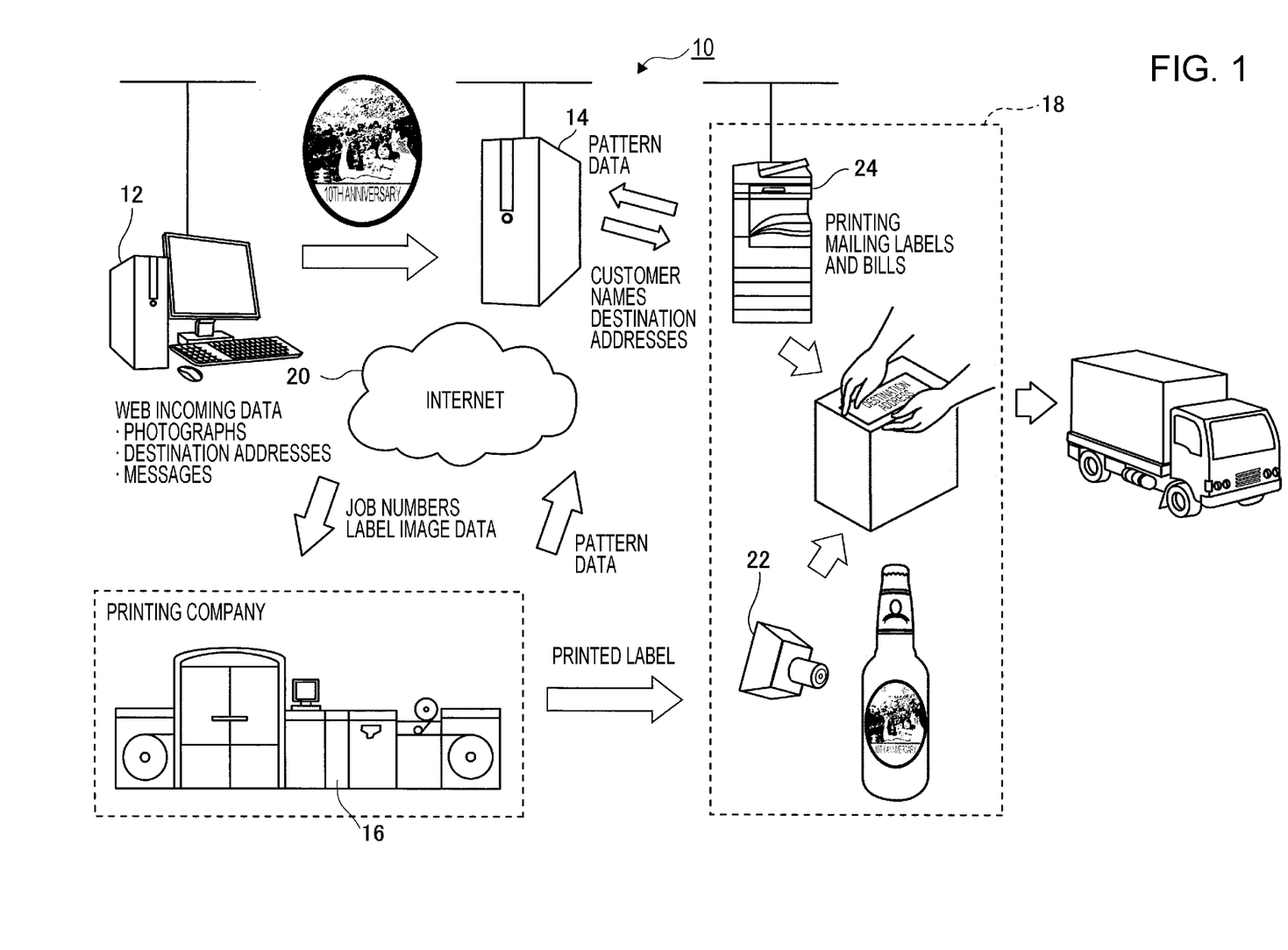
FIG. 1 illustrates a configuration of a product ordering and delivery system including an information processing apparatus of an exemplary embodiment.

Embodiment of the present invention is described in detail with reference to the drawings. FIG. 1 illustrates a whole product ordering and delivery system 10 of the exemplary embodiment.

The product ordering and delivery system 10 includes a product ordering apparatus 12, an information processing apparatus 14, an image forming apparatus 16, and a product delivery unit 18. These elements are interconnected via the Internet 20 for communication.

The product ordering apparatus 12 includes a personal computer of a customer, for example. The product ordering apparatus 12 allows a product selected by a customer and tagged with a label to be ordered. The product ordering apparatus 12 may receive a customer number, a destination address, a name, the number of prints on a web screen provided by the product ordering and delivery system 10. A photograph and a message may also be included as label image data. The photograph and the message may be selected using a template displayed on the web screen. When the product ordering apparatus 12 has received these pieces of data, the input data is transmitted to the information processing apparatus 14.

The information processing apparatus 14 may include a server, for example. The information processing apparatus 14 sets to be a job the customer number and the label image data received from the product ordering apparatus 12, assigns a job number to the job, and then transmits the job with the job number assigned thereto to the image forming apparatus 16.

Unlike the information processing apparatus 14 and the product delivery unit 18, the image forming apparatus 16 is a label printer and is installed in a printing company. The image forming apparatus 16 includes an image reading device, and is designed to read a pattern on a printed label image. The pattern read by the image forming apparatus 16 is transmitted to the information processing apparatus 14. The information processing apparatus 14 registers the read pattern with the job number associated therewith. The label printed by the image forming apparatus 16 is transmitted to the product delivery unit 18. The information processing apparatus 14 described above may be managed by the same company as the one which manages the product delivery unit 18.

The product delivery unit 18 performs an operation to glue a label on a product. The products with the labels glued on are packed in a box and then shipped. The destination of the product to be shipped and the destination address of the product are to match each other.

As previously described, the pattern of the label formed by the image forming apparatus 16 is registered in association with the job number. The product delivery unit 18 reads the pattern of the label image including the customer number printed on the label using a digital camera 22, for example. The pattern read by the digital camera 22 is tagged with the job number and is then transmitted to the image forming apparatus 16. The image forming apparatus 16 associates the pattern with the customer information via the job number. The information processing apparatus 14 includes a database that associates the destination address with the customer number, and returns the associated destination address to the destination address printer 24. The destination address printer 24 prints the returned destination address as a delivery invoice. An operator packs the product in a box, glues the deliver invoice onto the box, and ships the box to the customer. The box shipped to the customer may contain a message card or a direct mail.

In related art techniques, the pattern is a random pattern that plant fibers naturally form as a result of stacking each other in a random fashion. In accordance with the exemplary embodiment, the pattern within a predetermined region of the label image is read.

Figure 3:
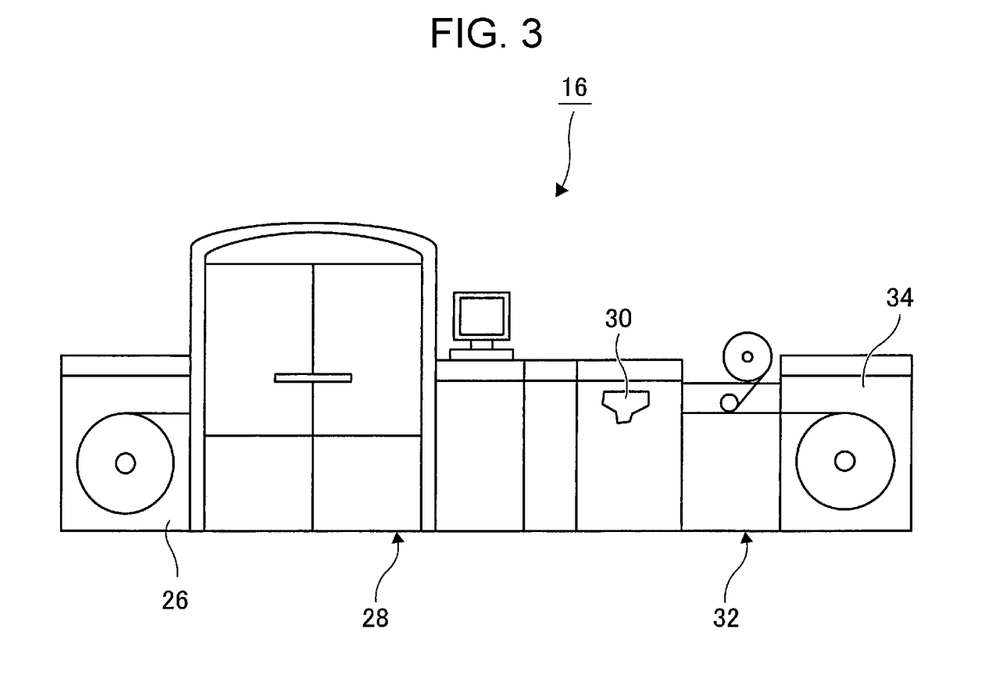
FIG. 3 is a front view of an image forming apparatus of the exemplary embodiment.

The image forming apparatus 16 is described in detail. Referring to FIG. 3, the image forming apparatus 16 includes a recording medium feeder 26, a printer 28, a reading unit 30, a processing unit 32, and a recording medium container 34.

Figure 2:
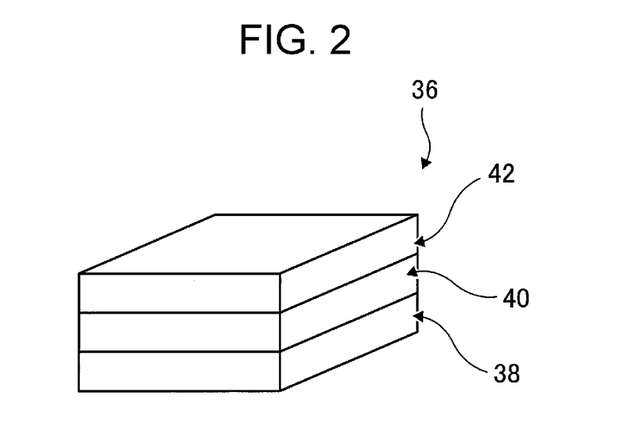
FIG. 2 is a perspective sectional view of a continuous recording medium used in the exemplary embodiment.

The recording medium feeder 26 feeds a continuous recording medium (a paper roll) to the printer 28. The recording medium container 34 stores the recording medium printed by the printer 28 and processed by the processing unit 32. The continuous recording medium 36 includes release paper 38, an adhesive agent 48, and a surface substrate 42 glued on each other as illustrated in FIG. 2. Upon receiving a job from the information processing apparatus 14, the image forming apparatus 16 consecutively prints labels in response to the job. The job is a collection of digital data in accordance with which a series of operations from the start of the printing to the end of the printing is performed.

Figure 4:
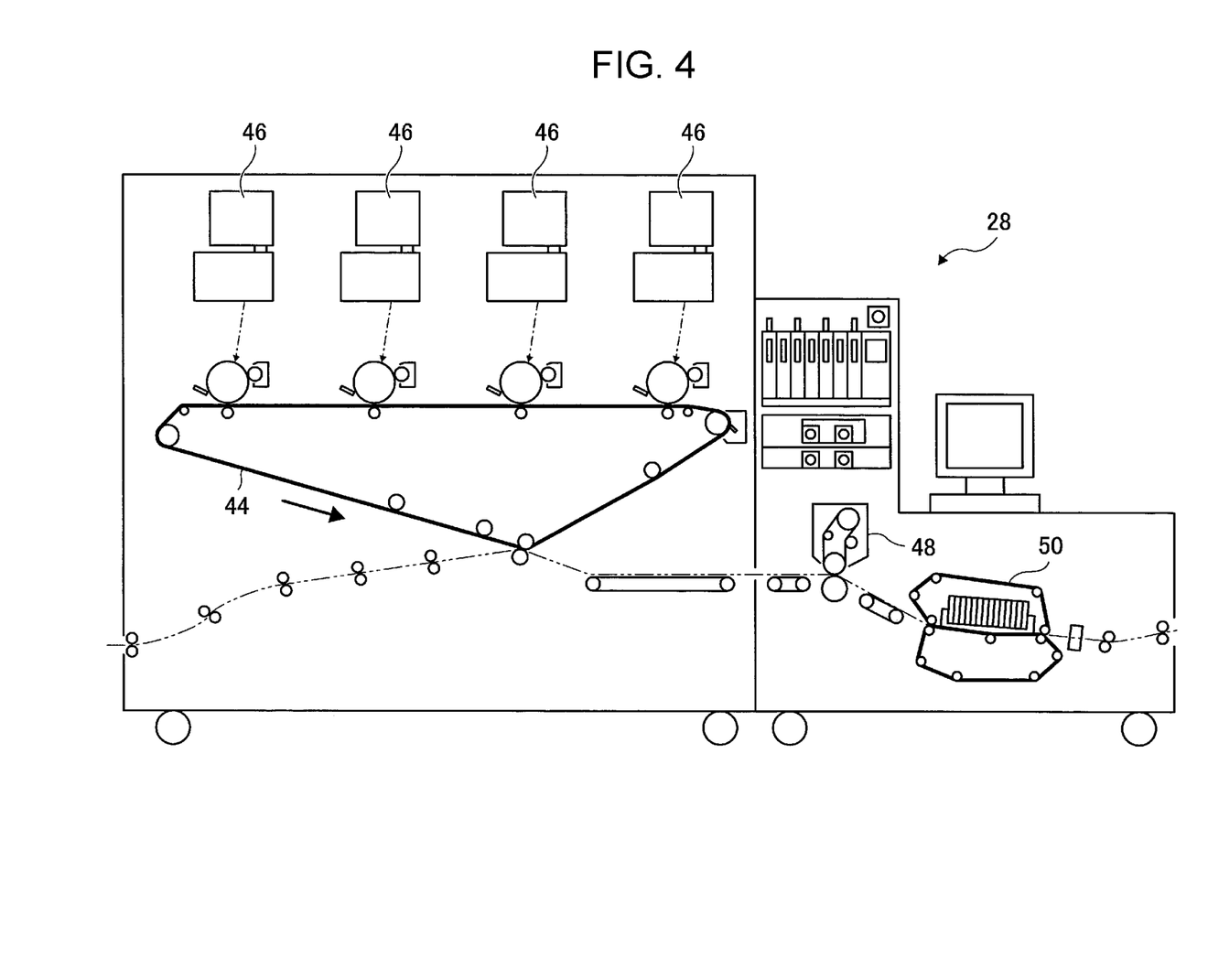
FIG. 4 is a sectional view of a printer of the image forming apparatus of the exemplary embodiment.

The printer 28 has a structure of FIG. 4. More specifically, the printer 28 includes four image forming units 46 upstream of the intermediate transfer belt 44. The image forming units 46 forms an image using cyan, magenta, yellow, and black toners.

A image formed on an intermediate transfer belt 44 by the image forming units 46 is transferred to a recording medium fed from the recording medium feeder 26. The recording medium having the image transferred thereon is sent to a fixing unit 48. The image is thus fixed onto the recording medium via heat and pressure. The recording medium with the image thus fixed is cooled by a cooling unit 50.

Figure 5:
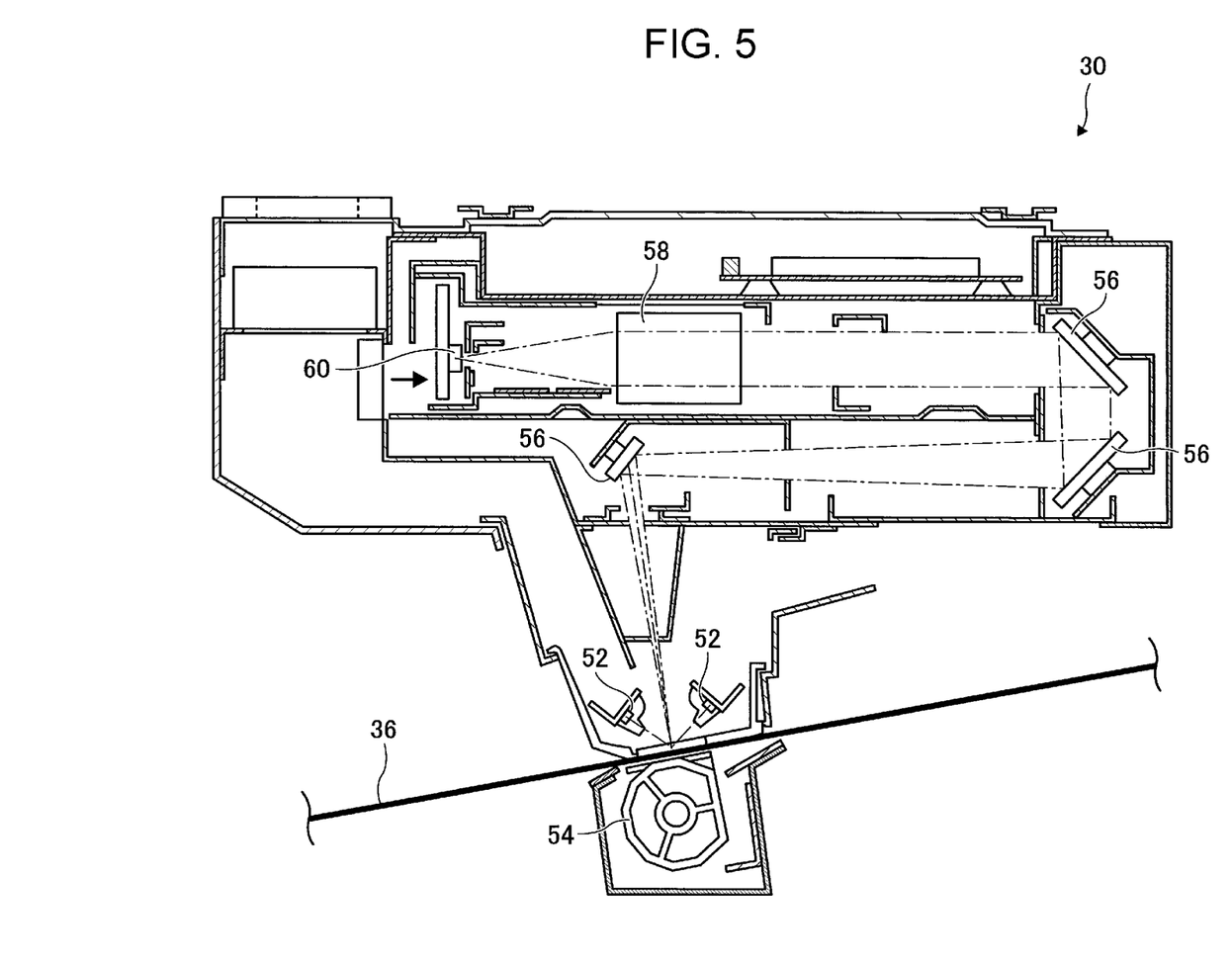
FIG. 5 is a sectional view of a reading unit of the image forming apparatus of the exemplary embodiment.

In the reading unit 30 as illustrated in FIG. 5, the continuous recording medium 36 having the image formed by the printer 28 receives, on a reference roller 54, light rays emitted from light emitting units 52, such as light emitting devices (LEDs). The light rays reflected from the recording medium are directed toward a lens barrel 58 through multiple mirrors 56. The light rays are collected by the lens barrel 58 and then read by an image reading sensor 60 including a charge-coupled device (CCD). The label image read by the digital camera 22 is transmitted to the information processing apparatus 14 via the Internet 20. The pattern is extracted from the label image read by the digital camera 22. The pattern may be extracted by the image forming apparatus 16 or the information processing apparatus 14.

Figure 6:
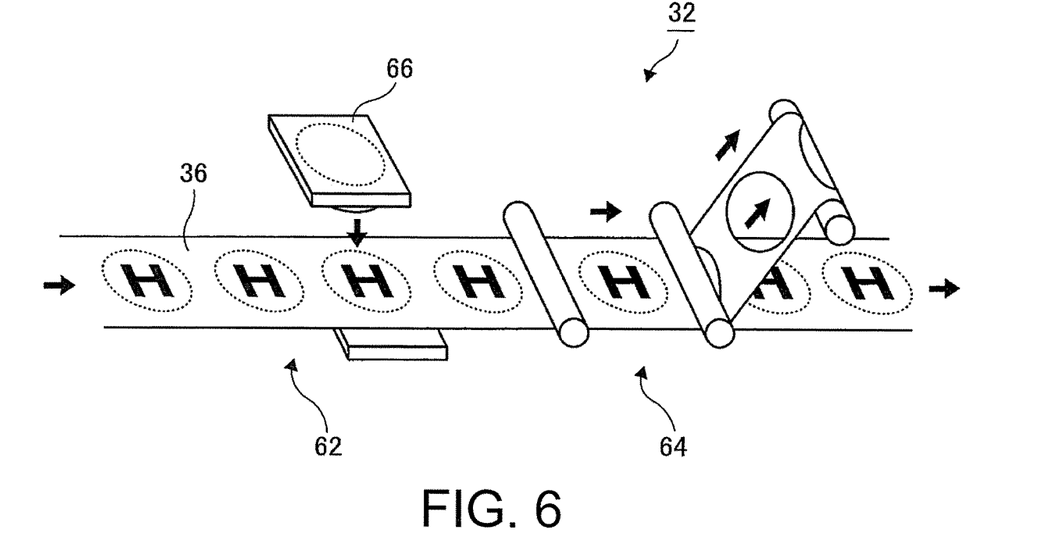
FIG. 6 is a perspective view of a processing unit of the image forming apparatus of the exemplary embodiment.

The processing unit 32 processes the continuous recording medium with the image formed thereon. In accordance with the exemplary embodiment, the processing unit 32 includes a punching section 62 and a residual portion lifting section 64 as illustrated in FIG. 6.

With a cutter 66, the punching section 62 cuts away a portion surrounding the label image printed on the surface substrate 42 of the continuous recording medium 36 excluding the release paper 38. The cutter 66 may be a physical cutter, or may be a laser cutter. The residual portion lifting section 64 winds the residual portion surrounding the label image cut by the punching section 62, thereby leaving the label image on the continuous recording medium 36.

The continuous recording medium with the label image formed thereon is wound by the recording medium container 34 and the label continuous recording medium thus wound is transferred to the product delivery unit 18.

Figure 7:
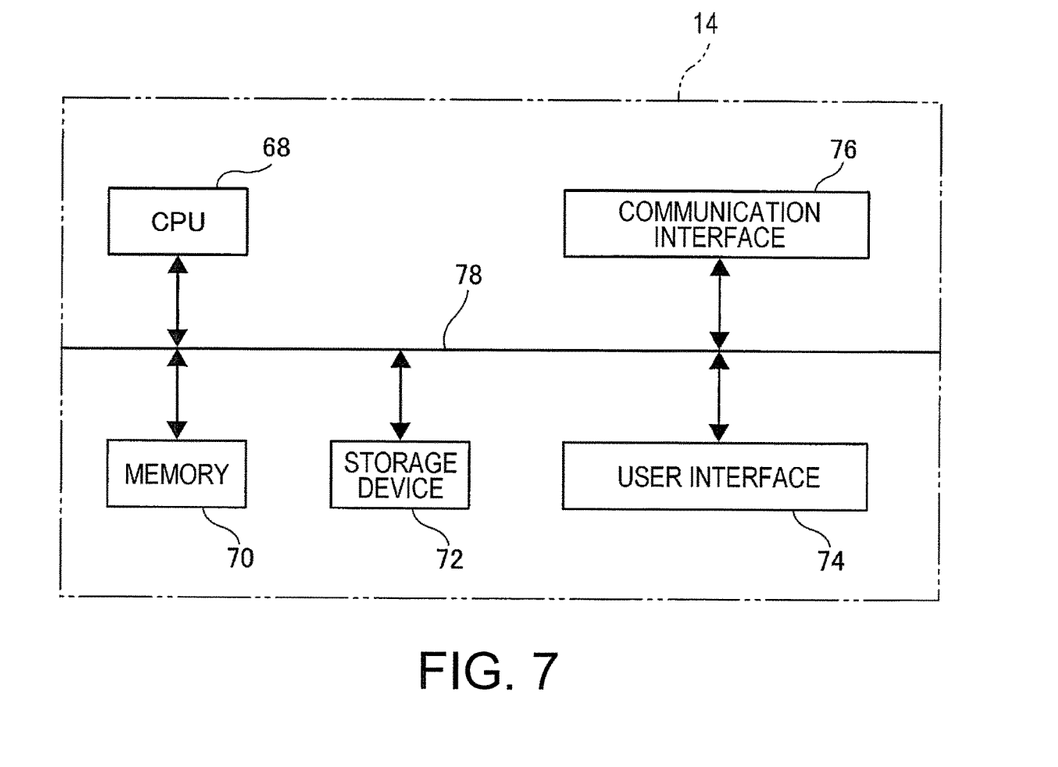
FIG. 7 is a block diagram illustrating hardware of an information processing apparatus of the exemplary embodiment.

The information processing apparatus 14 is described in detail. As illustrated in FIG. 7, the information processing apparatus 14 includes a central processing unit (CPU) 68, a memory 70, a storage device 72, a user interface 74, and a communication interface 76. These elements are interconnected to each other via a control bus 78.

The CPU 68 performs a predetermined process in accordance with a control program stored on the memory 70. The storage device 72 may include a hard disk, for example, and stores the customer information in the form of a database. The user interface 74 receives an operation from an operation display and displays the operation. The communication interface 76 exchanges data with the product ordering apparatus 12, the image forming apparatus 16, and the product delivery unit 18 via the Internet 20.

Figure 8:
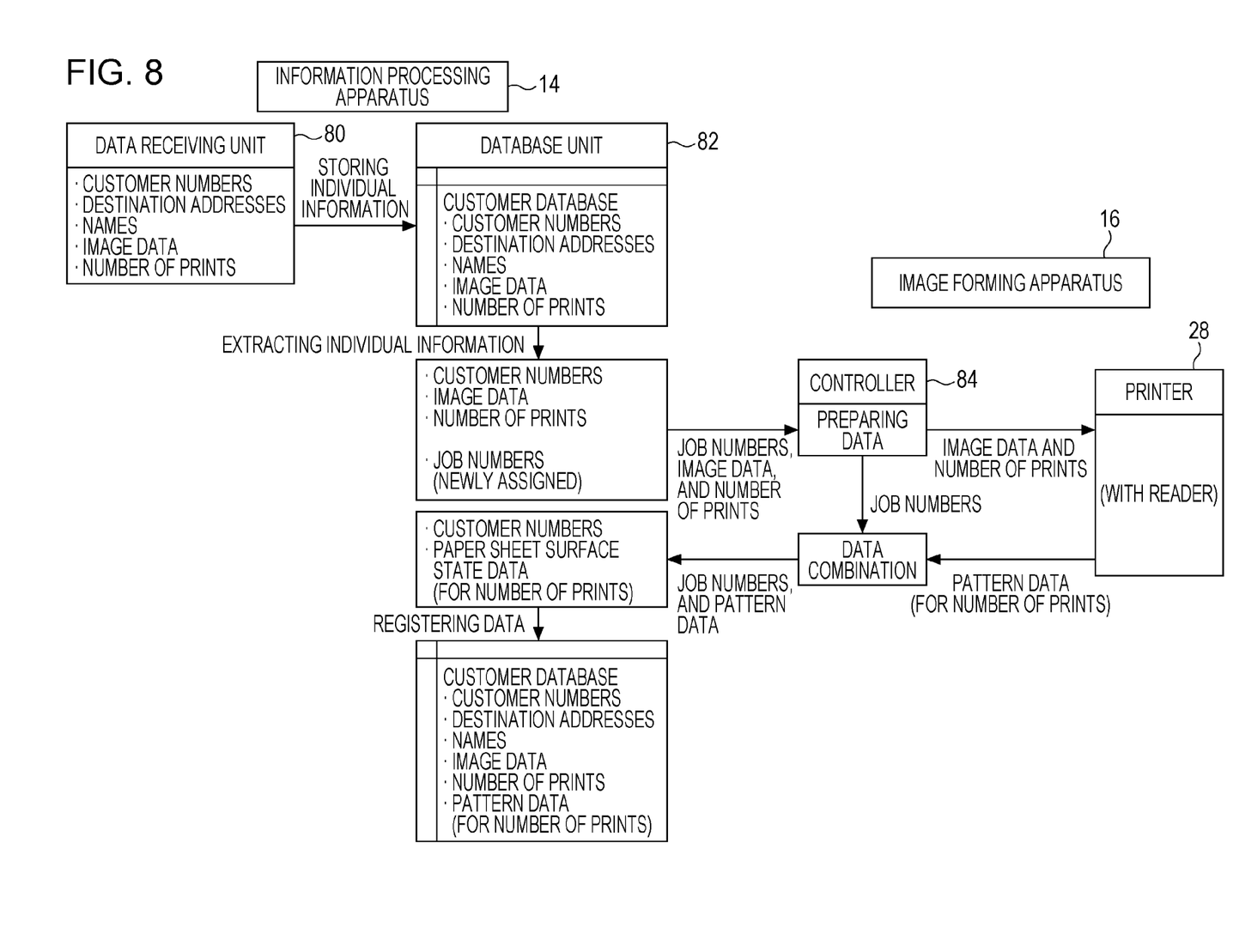
FIG. 8 is a functional block diagram of the information processing apparatus of the exemplary embodiment.

FIG. 8 is a functional block diagram of the information processing apparatus 14 and the image forming apparatus 16 when the database is registered. The data receiving unit 80 receives the customer information. The customer information includes the customer number, the destination address, the name, the image data, and the number of prints. The customer information is transferred from the data receiving unit 80 to a database unit 82. The database unit 82 forms a database of the customer information and stores the database on the storage device 72. Individual information is extracted from the database unit 82. The extracted data is a job, and a job number is assigned to the job.

The job with the job number assigned thereto is transmitted to the controller 84 in the image forming apparatus 16. The controller 84 stores the job number to prepare data, and notifies the printer 28 of the image data and the number of prints. The printer 28 prints the label image, and reads the pattern and transmits the pattern to the controller 84. The controller 84 combines the job number with pattern data, and transmits the pattern data combined with the job number to the database unit 82.

The database unit 82 associates the pattern data (desirably for several sheets of paper) with the customer information in accordance with the job number, and registers these pieces of data as the database again. In this way, the customer information is associated with the pattern.

Figure 9:
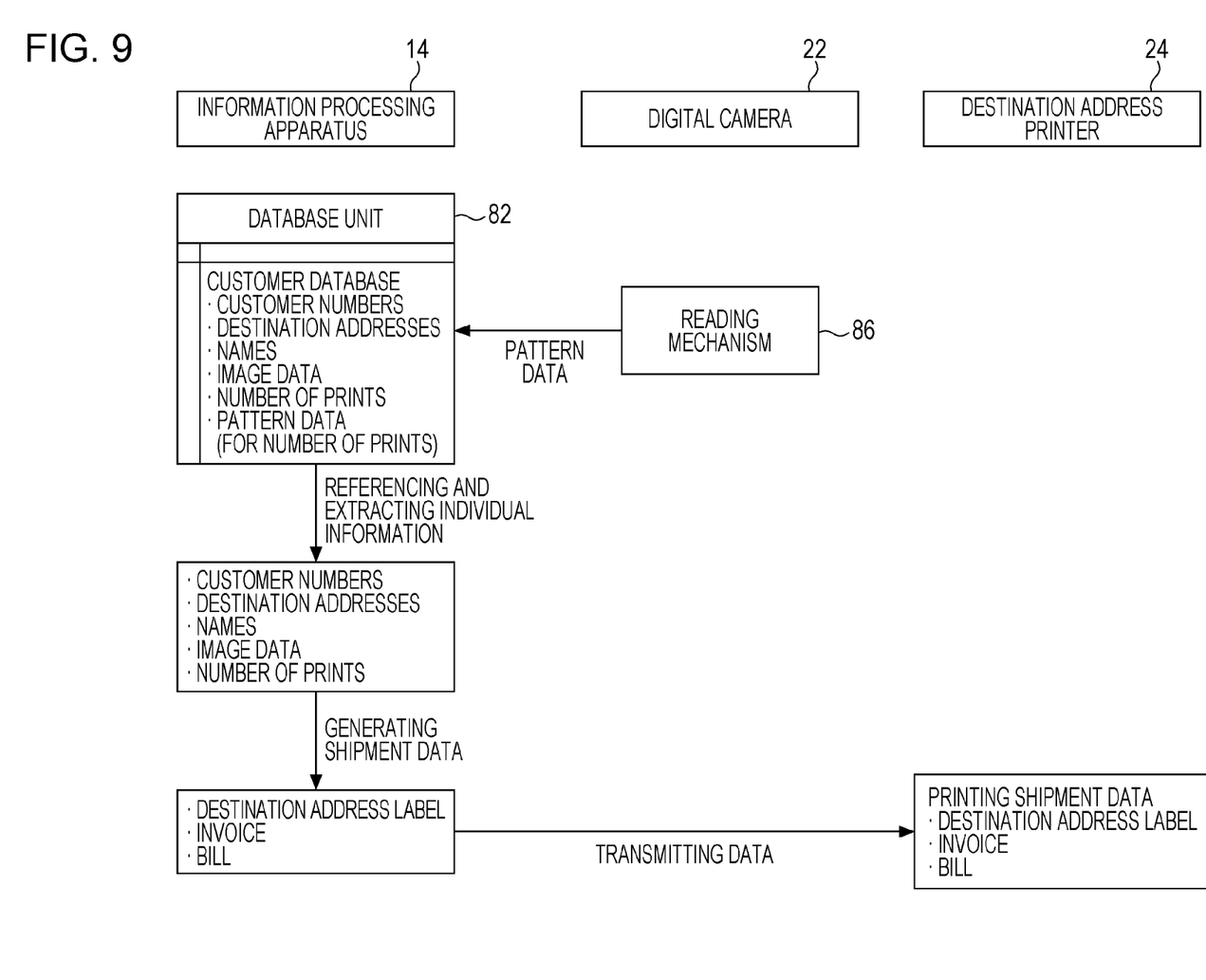
FIG. 9 is a functional block diagram of the information processing apparatus, a digital camera, and a destination address printer when a label image is transmitted to the information processing apparatus of the exemplary embodiment.

FIG. 9 is a functional block diagram illustrating the information processing apparatus 14, the digital camera 22, and the destination address printer 24 when the product is shipped.

The reading mechanism 86 in the digital camera 22 reads the pattern of the label image attached to the product, and transmits the pattern to the database unit 82 in the information processing apparatus 14. The individual information is referenced and extracted from the database unit 82. The individual information includes the customer number, the destination address, the name, the label image data, and the number of prints. A address label, an invoice, and a bill are generated from the extracted individual information, and then transmitted to the destination address printer 24 to end the process.

In the exemplary embodiment described above, the label is glued on the product. The present invention is not limited to the label. The present invention is applicable to a package housing a product, or a box containing a product.

In accordance with the exemplary embodiment, the state of the recording medium is the pattern. The present invention may include another example. For example, the state of the recording medium may include a drawing state of the image formed on the recording medium. The drawing state of the image may include an unevenness of the image. The unevenness of the image may be acquired by reading separately light rays that are reflected from the label image when the two light emitting units 52 emit light rays onto the label image, and registers the unevenness of the image.

A feature quantity of the label image may be acquired as below. The feature quantity of the label image may be acquired using related art techniques, such as histograms of oriented gradients (HOG) or scaled invariance feature transform (SIFT). For example, the feature quantity of the label image is registered on the database unit 82 on a per customer basis, the feature quantity of the label image read by the pattern reading unit 22 is compared with the feature quantity of the registered label image, and the customer information may be acquired from the label image having the closest feature quantity. This arrangement free from using the reading unit 30 in the image forming apparatus 16 that reads the state of the recording medium.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor, configured to:
receive customer information of a customer to whom a product is to be delivered and label image data;
transmit a print job comprising the label image data and a customer number in the customer information of the customer with an assigned job number to an external image forming apparatus;
acquire a state of a recording medium having image information printed thereon and to be attached to the product to be delivered from the external image forming apparatus along with the assigned job number, wherein the state of the recording medium is captured by an image capturing device, and wherein the image information comprising the label image data and the customer number; and
associate the acquired state of the recording medium with the received customer information and the assigned job number.

2. The information processing apparatus according to claim 1, wherein if the print job with the customer information assigned thereto in advance is performed, the processor associates the acquired state of the recording medium in response to the print job with the customer information.

3. The information processing apparatus according to claim 2, wherein the processor acquires a surface state of the recording medium having the image information printed thereon.

4. The information processing apparatus according to claim 3, wherein the processor acquires a pattern of the recording medium having the image information printed thereon.

5. The information processing apparatus according to claim 1, wherein the processor acquires a surface state of the recording medium having the image information printed thereon.

6. The information processing apparatus according to claim 5, wherein the processor acquires a pattern of the recording medium having the image information printed thereon.

7. The information processing apparatus according to claim 1, wherein the processor acquires a drawing state of the image information printed on the recording medium.

8. The information processing apparatus according to claim 7, wherein the processor acquires an unevenness state of the image information printed on the recording medium.

9. The information processing apparatus according to claim 7, wherein the processor acquires a feature quantity of the image information printed on the recording medium.

10. A printing system comprising:
a processor that receives customer information of a customer to whom a product is to be delivered and label image data and transmits a print job comprising the label image data and a customer in the customer information of the customer with an assigned job number to a printer;
the printer that prints image information on a recording medium, wherein the image information comprising the label image data and the customer number,
wherein the processor acquires a state of the recording medium having the image information printed thereon by the printer and to be attached to the product to be delivered from the printer along with the assigned job number, wherein the state of the recording medium is captured by an image capturing device, and
wherein the processor associates the acquired state of the recording medium with the received customer information and the assigned job number.

11. A non-transitory computer readable medium storing a program causing a computer to execute a process for processing information, the process comprising:
receiving customer information of a customer to whom a product is to be delivered and label image data;
transmitting a print job comprising the label image data and a customer number in the customer information of the customer with an assigned job number to an external image forming apparatus;
acquiring a state of a recording medium having image information printed thereon and to be attached to the product to be delivered from the external image forming apparatus along with the assigned job number, wherein the state of the recording medium is captured by an image capturing device, and wherein the image information comprising the label image data and the customer number; and associating the acquired state of the recording medium with the received customer information and the assigned job number.

\* \* \* \* \*